United States Patent [19]

Kelly

[11] Patent Number: 4,733,988

[45] Date of Patent: Mar. 29, 1988

[54] CLAMP FOR A SHEET

[76] Inventor: Clifford G. Kelly, P.O. Box 141, Surrey, British Columbia, Canada, V3T 4W4

[21] Appl. No.: 916,244

[22] Filed: Oct. 7, 1986

[51] Int. Cl.$^4$ .............................. F16B 7/04; F16B 2/18
[52] U.S. Cl. ..................................... 403/373; 403/375; 403/397; 24/327; 24/516
[58] Field of Search .................. 403/71, 110, 119, 290, 403/373, 375, 376, 397, 391, 405.1, 406.1; 24/514, 516, 487, 326, 327, 337, 339

[56] References Cited

U.S. PATENT DOCUMENTS

| 18,632 | 11/1857 | Cushman | 24/516 |
|---|---|---|---|
| 1,468,110 | 9/1923 | Howe | 24/326 |
| 4,097,169 | 6/1978 | Kelly | 403/391 |
| 4,170,995 | 10/1979 | Levine et al. | 24/326 |
| 4,492,005 | 1/1985 | Begley et al. | 24/516 |
| 4,497,092 | 2/1985 | Hoshino | 24/516 |

FOREIGN PATENT DOCUMENTS 2029490  3/1980  United Kingdom ................ 403/405

Primary Examiner—Randolph A. Reese
Assistant Examiner—Peter M. Cuomo
Attorney, Agent, or Firm—Townsend & Townsend

[57] ABSTRACT

A clamp to receive a protective sheet and retain that sheet in position over an object. The clamp has a first member having first and second ends and a second member also having first and second ends. There is a hinge joining the first and second members at their first ends. The first and second members are spaced from each other at a portion intermediate the first and second ends. A clamp extends between the two intermediate portions to force the two intermediate portions towards each other. At the first end of the first and second members the members can be clamped to retain the sheet. The clamp has a shaped portion on one member and a correspondingly shaped portion on the other member. There are projections formed on the shaped portion on one member and recesses to receive those projections formed on the correspondingly shaped portion on the other member.

9 Claims, 4 Drawing Figures

U.S. Patent  Mar. 29, 1988  4,733,988
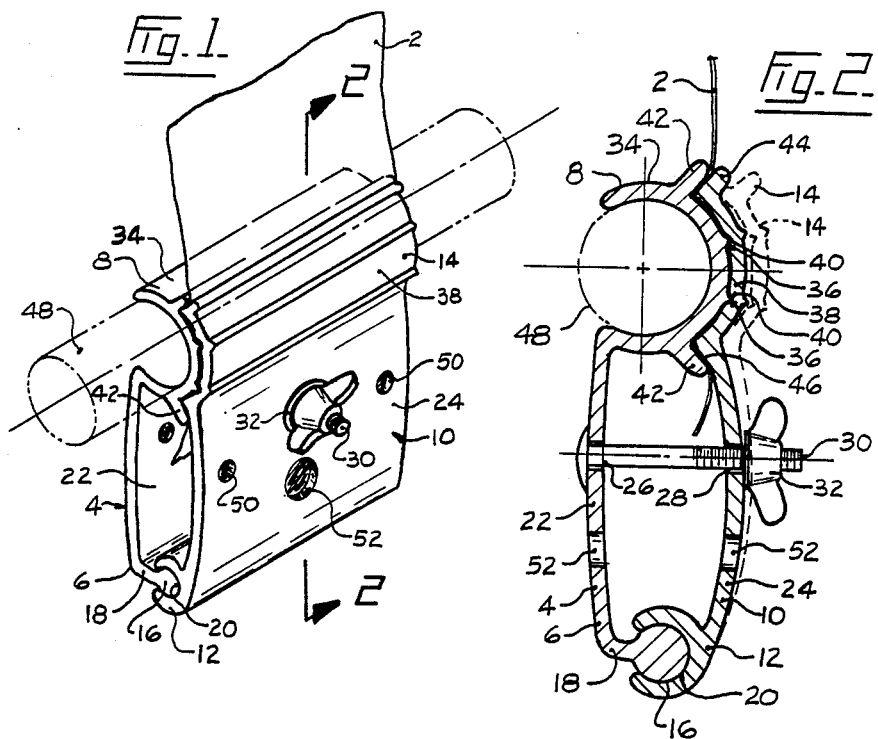
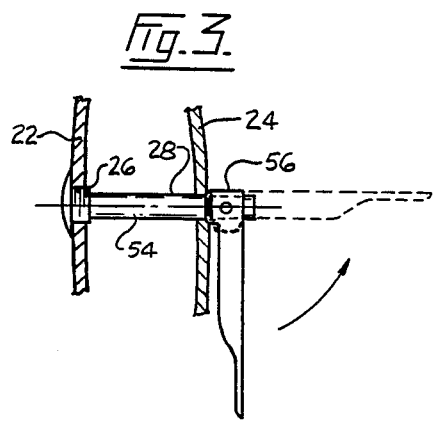
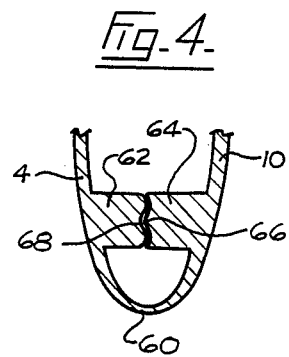

1

CLAMP FOR A SHEET

FIELD OF THE INVENTION

This invention relates to a clamp to receive a protective sheet and to retain that sheet in position over an object that is to be protected.

DESCRIPTION OF THE PRIOR ART

The use of sheets, for example tarpaulins and the like to protect objects is, of course, well known. My U.S. Pat. Ser. No. 4,097,169 issued June 27, 1978 describes and claims a clamp arrangement for securing the sheet material to a base. The arrangement can be used with any type of sheet material, such as canvas tarpaulin but is particularly designed for plastic sheet material, such as polyethylene.

The clamp arrangement of my above United States patent has proved to be an effective clamp arrangement but does suffer from a number of disadvantages. Thus it is necessary in the clamp arrangement of the patent that the sheet to be retained be wrapped around the retaining rod. Furthermore the preferred embodiment requires a pivotal joint which is not always desirable as it can lead to stress. Under extremely difficult conditions, particularly high winds, the round retaining rod can allow slippage of the sheet and although the rectangular cross section member described in the patent is more effective in this regard the use of separate retaining members of this nature, separate that is from the main structure of the clamp arrangement, is not entirely satisfactory. Furthermore the locking bar used in the above patent arrangement can be difficult to turn, even with the bail to provide the needed grip.

SUMMARY OF THE INVENTION

The present invention therefore seeks to provide improvements over the clamping arrangement of the above United States patent.

Accordingly the present invention is a clamp to receive a protective sheet and retain that sheet in position over an object, the clamp comprising a first member having first and second ends; a second member having first and second ends; a hinge joining the first and second members at their first ends; the first and second members being spaced from each other at a portion intermediate the first and second ends; clamping means extending between the two intermediate portions to force the two intermediate portions towards each other; cooperable means at the first end of the first and second members to clamp and retain the sheet and comprising a shaped portion on one member and a correspondingly shaped portion on the other member; and projections formed on the shaped portion on one member and recesses to receive those projections formed on the correspondingly shaped portion on the other member.

DRAWINGS

Aspects of the invention are illustrated, merely by way of example, in the accompanying drawings in which:

FIG. 1 is a perspective view of a clamp according to the invention;

FIG. 2 is a section on the line 2—2 in FIG. 1;

FIG. 3 illustrates a detail of a modification of the clamp of FIG. 1; and

FIG. 4 illustrates a detail of a further modification of the clamp.

DESCRIPTION OF THE PREFERRED EMBODIMENTS

The drawings show a clamp to receive a protective sheet 2 and to retain that sheet 2 in position over an object (not shown). In this regard the present invention is useful in any environment where it is required simply to locate a sheet, typically a water-proof sheet, over anything that is to be protected, including crops, vehicles, boats and the like.

The clamp comprises a first member 4 having a first end 6 and a second end 8. There is a second member 10 also having a first end 12 and a second end 14. A hinge joins the first and second members 2 and 10 at their first ends. In the preferred embodiment illustrated the hinge comprises a cylinder 16 formed on a limb 18 extending from the first end 6 of the first member 4. There is a corresponding open recess 20 to receive the cylinder 16 formed on the first end 12 of the second member 10. Typically the clamp of the present invention is formed of plastic and the resilience of the plastic is sufficient to allow the cylinder 16 and recess to be pushed together. The structure provides a hinge as shown particularly in FIG. 2. The structure, particularly the limb 18, also ensures that the first and second members 4 and 10 are spaced from each other at respective portions 22 and 24 intermediate the first and second ends.

There are clamping means extending between the two intermediate portions to force the two intermediate portions 22 and 24 towards each other when the clamp is required to clamp a protective sheet in position. In the embodiment of FIGS. 1 and 2 there are aligned openings 26 and 28 in the intermediate portions 22 and 24. A bolt 30 extends through the openings 26 and 28 and a nut (a wing-nut 32 is shown) is received on the bolt to apply the necessary clamping force. The unstressed position is shown in broken lines in FIG. 2. The stressed or useful position is in solid lines in FIG. 2. In this regard the intermediate portions 22 and 24 are bowed outwardly to facilitate the application of the force.

There are co-operable means at the first end of the first and second members to clamp and retain the sheet 2. In the preferred illustrated embodiment the co-operable means includes a cylindrical portion 34 at the second end 8 of the first member 4. Rounded projections 36 extend from the cylindrical portion 34. There is an arcuate portion 38 at the second end 14 of the second member 10. The internal surface of the arcuate portion 38 is formed with rounded recesses 40 to receive the projections 36 on these cylindrical portions. The rounding of projections 36 and recesses 40 is simply to reduce the risk of the sheet 2 tearing. As particularly illustrated in FIG. 2, there are wall members 42 extending outwardly from the cylindrical portion 34 that define an area of contact for the arcuate portion 36 and to provide a devious path for the sheet 2. The arcuate portion 36 is shaped to provide surfaces to abut the wall members 42. At the upper end there is a wall 44 similar to wall members 42. At the lower end the arcuate portion 36 merges into the intermediate portion 24 and, at the position of merging, is formed with a surface 46 that can contact the wall.

As shown particularly in FIG. 2 the cylinder 34 is open so that a rod 48 may be received with a press-fit. A rope may also be used. The function of the rod 48 or the rope is to attach adjacent clamping members to each other. Rod 48 is not essential.

The clamp is desirably provided with openings 50 in the intermediate parts 22 and 24 to receive locating means, for example screws or nails, and further openings 52 may be provided, to receive a rope, for example to attach the clamping means to a structure or to anchors in the ground.

FIG. 3 illustrates an aspect of the invention in which there is a shaft 54 extending through the openings 26 and 28. A cam 56 on the shaft is movable between the release position, shown in broken lines in FIG. 3, to a position where it applies a force to the intermediate portions, thus locking the clamp in a required position.

To use the clamp according to the present invention the sheet is inserted between the cylinder 34 and the arcuate surface 36 as shown in FIG. 2. The nut 32 is slackened to permit ingress of the sheet 2. Once the sheet is in position the nut is tightened or, in the case of the FIG. 3 embodiment, the handle is moved downwardly. The plastic sheet is then secured extremely securely to the clamping means and can be located in position.

FIG. 4 illustrates a modification of the invention that takes advantage of the excellent hinge capabilities of certain plastics, notably polypropylene.

The arrangement, at the base of the FIG. 2 embodiment including limb 18, cylinder 16 and recess 20 is replaced by a simple thinned band 60. Abutments 62 and 64 are provided to control separation. Abutment 62 has recess 68 to receive projection 66 and keep the abutments 62 and 64 aligned.

As in the above U.S. patent a plurality of these clamps will typically be placed at the edge of a protective sheet. The sheets are located either by bolts or the like extending through openings 52, to locate to a structure containing the item to be protected or by ropes extending through openings 52 to engage a fixed structure.

The rod 48 may be inserted to provide additional security as it acts to anchor adjacent clamps to each other.

The clamps are desirably made of metal or plastic material. Injection moulded plastic or extruded metal are appropriate. The former is generally cheaper. Each clamp is entirely self-contained and does not require additional members to provide clamping force.

I claim:

1. A clamp to receive a protective sheet and retain that sheet in position over an object, the clamp comprising:
    a first member having first and second ends;
    a second member having first and second ends;
    a hinge joining the first and second members at their first ends;
    the first and second members being spaced from each other at a portion intermediate the first and second ends;
    clamping means extending between the two intermediate portions to force the two intermediate portions towards each other;
    a first arcuate portion of the second end of the first member and having an outer surface;
    a plurality of projections extending radially outwardly from the outer surface of the first arcuate portion;
    a second arcuate portion of the second end of the second member and having an inner surface that corresponds to the outer surface of the first arcuate portion;
    a plurality of recesses in the inner surface of the second arcuate portion, each recess to receive a projection on the outer surface of the first arcuate portion;
    whereby said second arcuate portion may be inserted into the first arcuate portion to clamp the sheet therebetween, the plurality of projections cooperating with the plurality of recesses to assist in the clamping action.

2. A clamp as claimed in claim 1 in which the hinge comprises a cylinder formed on a limb extending from the first end of the first part;
    a corresponding open recess to receive the cylinder formed on the first end of the second part, the structure providing the hinge and the spacing of the intermediate parts.

3. A clamp as claimed in claim 1 including aligned openings in the first and second parts in the intermediate portions;
    a bolt to extend through the openings; and
    a nut to be received on the bolt to apply the clamping force.

4. A clamp as claimed in claim 1 including aligned openings in the first and second parts in the intermediate portions thereof;
    a shaft extending through the openings;
    a cam on the shaft movable between a release position and a position where it applies a force to the intermediate portions.

5. A clamp as claimed in claim 1 including wall members extending radially outwardly from the second arcuate portion to define an area of contact for the second arcuate portion and to provide a devious path for the sheet.

6. A clamp as claimed in claim 5 in which the second arcuate portion is shaped to provide surfaces that abut the wall members.

7. A clamp as claimed in claim 1 in which the second arcuate portion is open to receive a rod with a slide fit.

8. A clamp as claimed in claim 1 including openings in the intermediate parts to receive locating means.

9. A clamp as claimed in claim 1 including openings in the intermediate part to receive a rope.

* * * * *